United States Patent [19]

Stewart et al.

[11] Patent Number: 5,235,001

[45] Date of Patent: Aug. 10, 1993

[54] POLYESTER/POLYPHENYLENE ETHER BLENDS

[75] Inventors: Mark E. Stewart, Kingsport, Tenn.; Dennis J. Massa, Pittsford, N.Y.

[73] Assignee: Eastman Kodak Company, Rochester, N.Y.

[21] Appl. No.: 891,017

[22] Filed: Jun. 1, 1992

Related U.S. Application Data

[63] Continuation-in-part of Ser. No. 749,812, Aug. 26, 1991.

[51] Int. Cl.$^5$ .................. C08L 67/02; C08L 71/12
[52] U.S. Cl. ...................... 525/397; 525/133; 525/391; 525/396
[58] Field of Search .......................... 525/397

[56] References Cited

U.S. PATENT DOCUMENTS

| | | | |
|---|---|---|---|
| 3,644,574 | 2/1972 | Jackson et al. | 260/873 |
| 3,819,761 | 6/1974 | Lee | 260/874 |
| 4,491,649 | 1/1985 | Falk et al. | 525/92 |
| 4,845,160 | 7/1989 | Sybert | 525/391 |
| 4,885,334 | 12/1989 | Mayumi et al. | 525/66 |
| 4,891,405 | 1/1990 | McCready | 525/64 |

FOREIGN PATENT DOCUMENTS

| | | |
|---|---|---|
| 0276327 | 8/1987 | European Pat. Off. . |
| 0274140 | 7/1988 | European Pat. Off. . |
| 1125628 | 8/1968 | United Kingdom . |

OTHER PUBLICATIONS

Derwent abstract WPI Acc. No. 90–009530/02 (EP 349747 corresponding to U.S. Patent 5,008,333, copy attached).

Derwent Abstract WPI Acc. No. 68–77862P/00 (British Patent 1,110,195 corresponding to U.S. Patent 3,379,792, copy attached).

Primary Examiner—Patricia A. Short
Attorney, Agent, or Firm—Betty J. James; William P. Heath, Jr.

[57] ABSTRACT

This invention relates to thermoplastic molding compositions comprising the following:

(a) about 5 to about 95% by weight of a polyester or a polyester, comprising: repeat units derived from terephthalic acid, ethylene glycol, and 1,4-cyclohexanedimethanol wherein the mole ratio of ethylene glycol to 1,4-cyclohexanedimethanol is from 66:34 to 98:2, said polyester having an I.V. of about 0.3 dL/g to about 1.2 dL/g, and (b) about 5 to about 95% by weight of a polyphenylene ether.

The compositions are useful for producing clear articles by injection molding or extrusion.

7 Claims, 1 Drawing Sheet

POLYESTER/POLYPHENYLENE ETHER BLENDS

CROSS-REFERENCE TO RELATED APPLICATION

This application is a continuation in part of application Ser. No. 749,812 entitled COMPATIBLE POLYESTER BLENDS filed on Aug. 26, 1991, now pending.

FIELD OF THE INVENTION

The present invention relates to polyester/polyphenylene ether blends. The blends possess a balance of good appearance, mechanical properties, processability, and economic feasibility.

BACKGROUND OF THE INVENTION

Polyesters based on terephthalic acid, ethylene glycol and 1,4-cyclohexanedimethanol are useful for producing clear articles by injection molding or extrusion. For many applications, these materials have sufficient thermal dimensional stability. However, for other applications such as medical devices requiring steam sterilization, there is a need for further improvements in thermal dimensional stability. Some improvements have occurred in this area. For example, polyesters have been blended with polystyrene as disclosed in U.S. Pat. No. 3,644,574, assigned to Eastman Kodak Company, Rochester, N.Y. Polyesters have also been blended with styrene maleic anhydride copolymers as disclosed in U.S. Pat. No. 4,891,405, assigned to Arco Chemical Co. Also, polyesters have been blended with acrylonitrilebutadiene styrene-polymers as disclosed in Modern Plastics Encyclopedia published in 1990 by McGraw Hill, Inc. However, blends containing significant quantities of dissimilar polymers are typically opaque.

Surprisingly, we have found that blends of certain polyesters with polyphenylene oxide (or polyphenylene ether) polymers exhibit marked clarity. Polyphenylene ether polymers are clear and possess attractive thermal dimensional stabilities, but they are difficult to process and relatively expensive. These deficiencies can be overcome by adding other polymers, such as high impact polystyrene as disclosed in British Patent 1,125,628 by R. W. Finholt, assigned to General Electric Company, or polycarbonate as disclosed in U.S. Pat. No. 4,401,649, assigned to Borg Warner Chemicals. These compositions are generally opaque.

Therefore, there is a continuing need in various research and industrial arts for polyesters having good thermal dimensional stability, clarity, ease in processing, and economic feasibility.

SUMMARY OF THE INVENTION

The needs in the art noted above are met with a clear thermoplastic molding composition comprising:
(a) about 5 to about 95% by weight of a polyester, comprising: repeat units derived from terephthalic acid, ethylene glycol, and 1,4-cyclohexanedimethanol wherein the mole ratio of ethylene glycol to 1,4-cyclohexanedimethanol is from about 66:34 to about 98:2, said polyester having an I.V. (inherent viscosity) of about 0.3 dL/g to about 1.2 dL/g, and
(b) about 5 to about 95% by weight of a polyphenylene ether polymer, said polyphenylene ether having an intrinsic viscosity of about 0.15 to 0.60 dL/g.

The present invention has the advantages of good thermal dimensional stability, good processability, good economical feasibility, and good clarity.

DETAILED DESCRIPTION OF THE PREFERRED EMBODIMENTS

Figure 1:
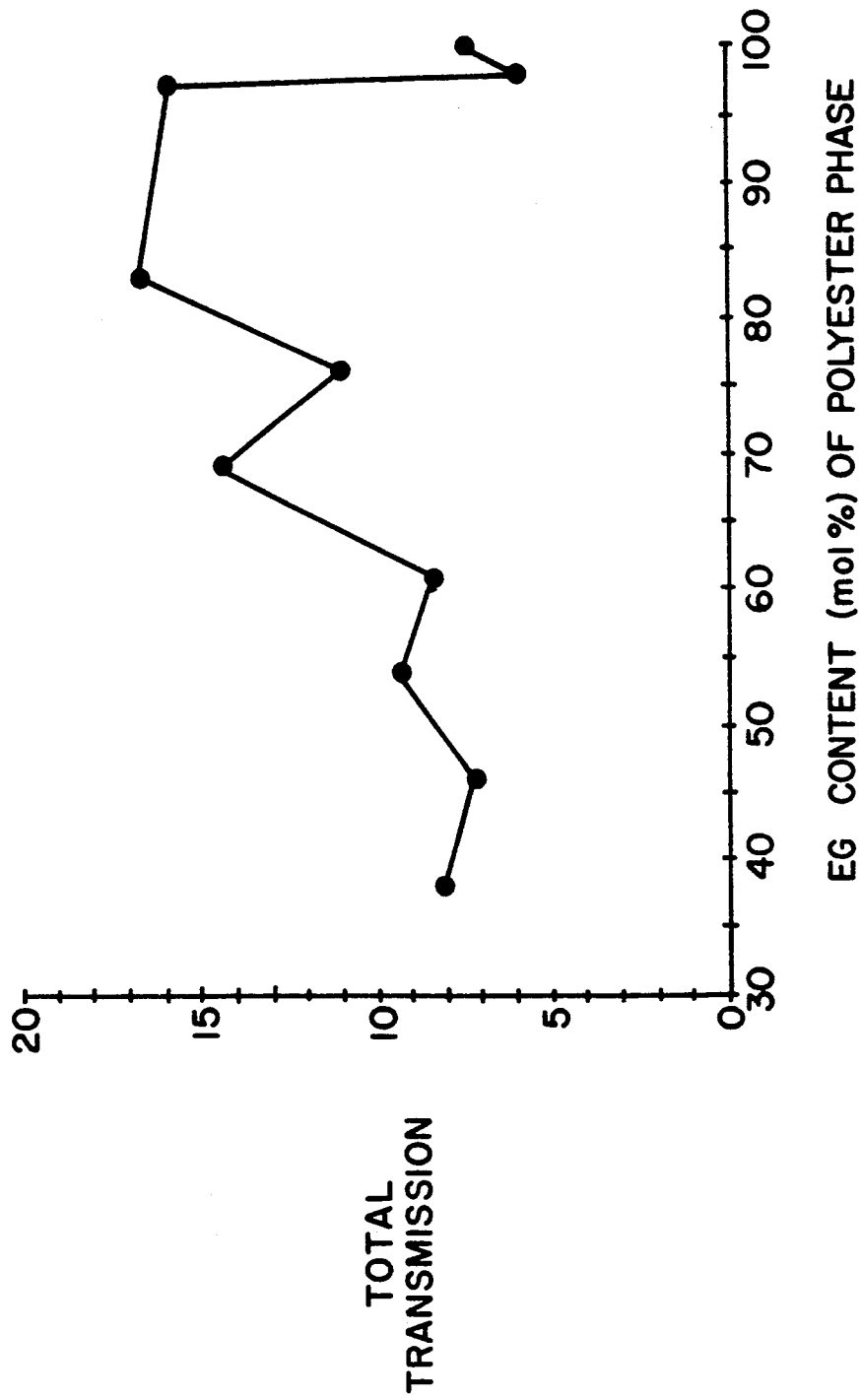
FIG. 1—a graphical representation of total transmission data (average values when there was more than one sample with the same composition) which is plotted versus ethylene glycol content of the polyester as shown for the samples contained in Table 5.

The blends of the invention relate to clear thermoplastic molding compositions comprising:
(a) about 5 to about 95% by weight of a polyester, comprising: repeat units derived from terephthalic acid, ethylene glycol, and 1,4-cyclohexanedimethanol wherein the mole ratio of ethylene glycol to 1,4-cyclohexanedimethanol is from about 66:34 to about 98:2, said polyester having an I.V. of about 0.3 dL/g to about 1.2 dL/g.

The polyesters useful in the present invention are commercially available or may be prepared using conventional polycondensation procedures. The polyesters may be modified with insignificant quantities of other dicarboxylic acids, glycols, and/or hydroxy acids. The polyesters should contain at least 2 mol % 1,4-cyclohexanedimethanol but not more than 34 mol % 1,4-cyclohexanedimethanol. In addition, the polyester component may contain minor amounts of additional polymers. These modifications must not, however, reduce the clarity of the polyester component. Useful polyesters are commercially available from the Eastman Kodak Company under the trade names EKTAR ® and KODAPAK ®.

Particularly useful polyesters include:

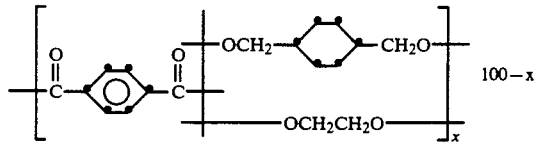

The polyester should have an x value of 66-98 in order to retain optimum optical clarity of the blend.

It is preferred that the mole ratio of ethylene glycol to 1,4-cyclohexanedimethanol is about 69:31 to about 98:2. It is more preferred that the mole ratio of ethylene glycol to 1,4-cyclohexanedimethanol is about 82:18 to about 97:3. It is also preferred that the mole ratio of ethylene glycol to 1,4-cyclohexanedimethanol is about 69:31.

The blends of the invention also comprise (b), about 5 to about 95% by weight of a polyphenylene ether, said polyphenylene ether having an intrinsic viscosity of about 0.15 dL/g to about 0.60 dL/g.

Useful polyphenylene ether containing polymers are described, for example in U.S. Pat. No. 4,885,334 at Col. 1-Col. 2. These polymers are obtained by the polycondensation of one or a mixture of phenols represented by the formula:

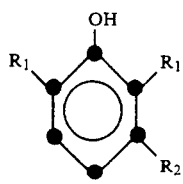

wherein $R^1$ represents a lower alkyl group having from 1 to 3 carbon atoms; and $R^2$ and $R^3$ each represents a hydrogen atom or a lower alkyl group having from 1 to 3 carbon atoms. Homopolymers of 2,6-dimethylphenol are preferred, though the polyphenylene ether component may also be modified with insignificant quantities of conventional comonomers and may contain minor amounts of additional polymers, as long as these modifications do not reduce clarity of the polyphenylene ether component.

The polyphenylene ether resin embraces graft polymers obtained by grafting an aromatic vinyl compound to a polyphenylene ether resin.

Specific examples of the monocyclic phenols represented by the formula (I) include 2,6-dimethylphenol, 2,6-diethylphenol, 2,6-dipropylphenol, 2-methyl-6-ethylphenol, 2-methyl-6-propylphenol, 2-ethyl-6-propylphenol, 2,3-dimethylphenol, 2,3-diethylphenol, 2,3-dipropylphenol, 2-methyl-3-ethyl-phenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3 -propylphenol, etc. Specific examples of the polyphenylene ether resins obtained by the polycondensation of one or more of these phenols are poly(2,6-dimethyl-1,4-phenylene)ether, poly(2,6-diethyl-1,4-phenylene)ether, poly(2-methyl-6-ethyl 1,4-phenylene)ether, poly(2-methyl-6-propyl 1,4-phenylene)ether, poly(2,6-dipropyl-1,4-phenylene)ether, poly(2-ethyl-6-propyl-1,4-phenylene)ether, a 2,6-dimethylpheno/2,3,6-trimethylphenol copolymer, a 2,6-dimethylpheno/2,3,6-triethylphenol copolymer, 2,6-diethylpheno/2,3,6-trimethylphenol copolymer, a 2,6-dipropylpheno/2,3,6-trimethylphenol copolymer, a graft copolymer obtained by grafting styrene to a 2,6-dimethylpheno/2,3,6-trimethyphenol copolymer, etc. Homopolymers of 2,6-dimethylphenol are preferred.

In a typical test for clarity, a blend is considered to be clear if ordinary newsprint can be read through a sample of the material.

The blends may be prepared by any method known in the art. For example, the blends may be compounded in the melt or by mixing of the components in powder form and then melt extruding the mixture the mixture using a single screw or twin screw extruder. In another method, both components are dissolved in a common solvent and then precipitated in a non solvent for both of the polymers. In another method, both components are dissolved in a common solvent and solvent cast onto an inert substrate.

It is within the scope of this invention to add compatibilizers to the blend or employ other compatibilization schemes, as long as these modifications do not substantially reduce the clarity of the blend. Compatibilization of polyester/polyphenylene ether blends is disclosed in EP A 0274140 published on Jul. 13, 1988, EP A 0276327 published on Aug. 3, 1988, and U.S. Pat. No. 4,845,160 filed on Feb. 5, 1988.

Additional components such as stabilizers, flame retardants, colorants, lubricants, mold release agents, and the like may also be incorporated into the blend as long as they do not substantially reduce the clarity of the blend.

It is preferred that the I.V. of the polyesters of the compositions of the invention are from about 0.70 dL/g to about 1.0 dL/g.

As used herein, the inherent viscosity (I.V.) of the polyester is measured at 25° C. using 0.50 g of polymer per 100 mL of a solvent consisting of 60% by weight phenol and 40% by weight tetrachloroethane. The intrinsic viscosity of the polyphenylene ether is measured at 25° C. in chloroform.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise noted.

EXAMPLES

The following polyesters of terephthalic acid, ethylene glycol, and 1,4-cyclohexanedimethanol were used in the examples which follow:

Polyester A—100 mol % ethylene glycol, 0 mol % 1,4-cyclohexanedimethanol. Nominal IV=0.72 dL/g. (Comparative)

Polyester B—96.5 mol % ethylene glycol, 3.5 mol % 1,4-cyclohexanedimethanol. Nominal IV=0.75 dL/g.

Polyester C—96.5 mol % ethylene glycol, 3.5 mol % 1,4-cyclohexanedimethanol. Nominal IV=0.96 dL/g.

Polyester D—69 mol % ethylene glycol, 31 mol % 1,4-cyclohexanedimethanol. Nominal IV=0.75 dL/g.

Polyester E—38 mol % ethylene glycol, 62 mol % 1,4-cyclohexanedimethanol. Nominal IV=0.75 dL/g. (Comparative)

Polyester F—19 mol % ethylene glycol, 81 mol % 1,4-cyclohexanedimethanol. Nominal IV=0.77 dL/g. (Comparative)

Polyester G—0 mol % ethylene glycol, 100 mol % 1,4-cyclohexanedimethanol. Nominal IV=0.75 dL/g. (Comparative)

For all examples, the specific polyphenylene ether used was a homopolymer of poly(2,6-dimethyl phenylene ether) with an intrinsic viscosity of 0.46 dL/g.

Except where noted, melt blending was performed using a ⅜ inch diameter single screw extruder manufactured by Brabender. Test specimens were molded using a Boy 22S injection molding machine. 1/16" Dogbone shaped tensile test specimens were molded. The bars were gated so that the molten polymer entered at one end of the specimen. The runner and gate formed a 90° angle with the major axis of the test specimen. Prior to extrusion compounding, the samples were tumble blended in a polyethylene bag. The PPO (polyphenylene ether) was in powder form. The polyesters were in powder or pellet form. All samples were dried for at least 16 hrs under vacuum to minimize hydrolysis of the polyester component during processing. Compositions, drying temperatures, and processing temperatures for the various examples are presented in Table 1. The mold temperature was maintained at 23° C.

Clarity of the injection molded samples was assessed by placing the end farthest from the gate of 1/16 inch thick dog bone shaped tensile specimen in contact with a typewritten page (contact clarity) and by noting the appearance of the same portion of the sample when the sample was placed between the observer and a light source (transmittance). Heat Deflection Temperatures (HDT's) were determined according the ASTM Method D648 using ⅛ inch specimens.

EXAMPLES 1-8

50/50 (by weight) blends of each of the polyesters with polyphenylene ether were prepared according to the procedure described above. Results are presented in Table 2. These results demonstrate that the blends of this invention containing polyesters of terephthalic acid, ethylene glycol and 1,4-cyclohexanedimethanol (examples 3 through 5) have surprisingly better clarity than blends containing homopolyesters of terephthalic acid and ethylene glycol (examples 1 and 2) or terephthalic acid and 1,4-cyclohexanedimethanol (example 8) or blends containing polyesters with compositions outside this invention (Examples 6 and 7).

EXAMPLES 9-18 were prepared as described above. These results, which are presented in Table 2, demonstrate that the unexpected clarity of the blends of the present invention is obtained for widely varying ratios of polyester to polyphenylene ether. At a given blend ratio the compositions of the present invention exhibit better clarity than the blends containing copolyester E. These results also clearly demonstrate the increase in heat deflection temperature possible through the addition of polyphenylene ether to the polyester.

EXAMPLES 19, 20 AND 21

50/50 (by weight) blends of polyphenylene ether were prepared with the following polyesters: polybutylene terephthalate (example 19 (comparative)), polyethylene naphthalate (example 20 (comparative)), and polyester D (example 21). These samples were blended and extruded into film using a ¼ inch diameter single screw laboratory extruder. Continuous films approximately 2 inch wide and 0.015 to 0.25 inch thick were obtained. Though the films obtained have relatively poor surface quality and are much thinner than the injection molded specimens, the blend of the present invention (example 21) has better clarity than the other two compositions.

TABLE 1

DRYING AND PROCESSING TEMPERATURES FOR POLYESTER/POLYPHENYLENE ETHER BLENDS

| Example # | Polyester | Polyester Wt % | Drying Temp. (°C.) | Compounding Temp. (°C.) | Molding Temp. (°C.) |
| --- | --- | --- | --- | --- | --- |
| 1 (comparative) | A | 50 | 110/60* | 280 | 280 |
| 2 (comparative) | A | 50 | 110 | 280 | 280 |
| 3 | B | 50 | 110 | 280 | 280 |
| 4 | C | 50 | 110/60* | 280 | 280 |
| 5 | D | 50 | 70 | 280 | 280 |
| 6 (comparative) | E | 50 | 60 | 260 | 260 |
| 7 (comparative) | F | 50 | 70 | 280 | 280 |
| 8 (comparative) | G | 50 | 60 | 320 | 320 |
| 9 (comparative) | E | 100 | 60 | 260 | 260 |
| 10 (comparative) | E | 75 | 60 | 260 | 260 |
| 11 (comparative) | E | 50 | 60 | 260 | 260 |
| 12 (comparative) | E | 25 | 60 | 260 | 300 |
| 13 (comparative) | E | 0 | 60 | 280 | 320 |
| 14 (comparative) | C | 100 | 110/60* | 280 | 280 |
| 15 | C | 75 | 110/60* | 280 | 280 |
| 16 | C | 50 | 110/60* | 280 | 280 |
| 17 | C | 25 | 110/60* | 280 | 280 |
| 18 (comparative) | C | 0 | 60 | 280 | 320 |

*Polyester portion dried at 60° C. polyphenylene ether portion at 110° C.

Blends of polyester E with PPO and blends of polyester C with PPO with varying ratios of polyester to PPO

TABLE 2

CLARITY AND (HDT) OF POLYESTER/POLYPHENYLENE ETHER BLENDS

| Example # | Contact Clarity | Transmittance | HDT @ 66 psi (°C.) | HDT @ 264 psi (°C.) |
| --- | --- | --- | --- | --- |
| 1 (comparative) | Marginal/Poor | Very Poor | 75 | 68 |
| 2 (comparative) | Marginal | Poor | 78 | 68 |
| 3 | Good | Marginal | 75 | 66 |
| 4 | Very Good | Good | 84 | 72 |
| 5 | Very Good | Good | 79 | 70 |
| 6 (comparative) | Good | Good | 83 | 74 |
| 7 (comparative) | Marginal | Good | 83 | 76 |
| 8 (comparative) | Poor | Very Poor | 180 | 84 |
| 9 (comparative) | Excellent | Excellent | 73 | 65 |
| 10 (comparative) | Good | Good | 78 | 67 |
| 11 (comparative) | Good | Good | 83 | 74 |
| 12 (comparative) | Very Good/Good | Good | 187 | 151 |
| 13 (comparative) | Excellent | Excellent | 198 | 181 |
| 14 (comparative) | Excellent | Excellent | 72 | 65 |
| 15 | Very Good | Good | 71 | 64 |
| 16 | Very Good | Good | 84 | 72 |
| 17 | Very Good | Good | 196 | 155 |

TABLE 2-continued

CLARITY AND (HDT) OF POLYESTER/POLYPHENYLENE ETHER BLENDS

| Example # | Contact Clarity | Transmittance | HDT @ 66 psi (°C.) | HDT @ 264 psi (°C.) |
| --- | --- | --- | --- | --- |
| 18 (comparative) | Excellent | Excellent | 198 | 181 |

The 1/16" thick dog bone specimens as described herein may be further described as ASTM D 1822 1/16" thick Type L specimens.

EXAMPLES 22–36

Polyester/polyphenylene ether melt blends were prepared as described in Examples 1–8. Compositions of the blends are presented in Table 3. The specific processing conditions are presented in Table 4. As shown in Table 3, the ethylene glycol content of the polyester phase was adjusted by using blends of polyesters and varying the type and ratios of polyesters within the polyester phase.

The samples were injection molded into $\frac{1}{8}" \times \frac{1}{2}" \times 5"$ flexural specimens. The appearance of the test specimens was evaluated by a qualitative visual inspection and in the following manner. The total transmission through the $\frac{1}{8}"$ thick flexural specimens was evaluated using ASTM D1003, with the following modification: The aperture governing the size of the area measured was reduced to allow testing of samples with smaller surface areas. Measurements were obtained approximately one inch from the gated end of the specimen using a $\frac{3}{8}"$ diameter circular aperture. The equipment used was a Hunterlab Ultrascan Sphere Spectrocolorimeter. These total transmission data correlate with the qualitative appearance and contact clarity of the samples. Results are presented in Table 5. For each example, the data presented in the table represent the average of one measurement from two test specimens. These data clearly demonstrate the unexpected appearance and contact clarity of the compositions of the present invention. This is emphasized in FIG. 1, where the total transmission data (average values when there was more than one sample with the same composition) are plotted versus ethylene glycol content of the polyester.

TABLE 3

Compositions of Polyester/Polyphenylene Ether Blend Examples 22 through 36

| Example | Polyphenylene Ether (wt. %) | Polyester A (wt. %) | Polyester B (wt. %) | Polyester C (wt. %) | Polyester D (wt. %) | Polyester E (wt. %) | Average Mole % of Ethylene Glycol of the Polyester Phase |
| --- | --- | --- | --- | --- | --- | --- | --- |
| 22 (comparative) | 50 | — | — | — | — | 50 | 38 |
| 23 (comparative) | 50 | — | — | — | 12.5 | — | 46 |
| 24 (comparative) | 50 | — | — | — | 25 | — | 54 |
| 25 (comparative) | 50 | — | — | — | 37.5 | — | 61 |
| 26 | 50 | — | — | — | 50 | — | 69 |
| 27 | 50 | — | — | 12.5 | 37.5 | — | 76 |
| 28 | 50 | — | — | 25 | 25 | — | 83 |
| 29 | 50 | — | 50 | — | — | — | 97 |
| 30 | 50 | — | 37.5 | 12.5 | — | — | 97 |
| 31 | 50 | — | 25 | 25 | — | — | 97 |
| 32 | 50 | — | 12.5 | 37.5 | — | — | 97 |
| 33 | 50 | — | — | 50 | — | — | 97 |
| 34 (comparative) | 50 | 25 | 25 | — | — | — | 98 |
| 35 (comparative) | 50 | 25 | — | 25 | — | — | 98 |
| 36 (comparative) | 50 | 50 | — | — | — | — | 100 |

TABLE 4

Drying and Processing Temperatures for Polyester/Polyphenylene Ether Blends

| Example | Drying Temp. (°C.) | Compounding Temp. (°C.) | Final Zone Molding Temp. (°C.) |
| --- | --- | --- | --- |
| 22 | 110 | 290 | 290 |
| 23 | 60 | 290 | 290 |
| 24 | 60 | 290 | 290 |
| 25 | 60 | 290 | 290 |
| 26 | 60 | 290 | 290 |
| 27 | 60 | 290 | 290 |
| 28 | 60 | 290 | 290 |
| 29 | 110 | 290 | 290 |
| 30 | 110 | 280 | 290 |
| 31 | 110 | 280 | 290 |
| 32 | 110 | 290 | 290 |
| 33 | 110 | 280 | 290 |
| 34 | 110 | 290 | 290 |
| 35 | 110 | 290 | 290 |
| 36 | 110 | 290 | 290 |

TABLE 5

Appearance of Examples 22 Through 36

| Example | Average Mole % Ethylene Glycol of the Polyester Phase | Transmission |
| --- | --- | --- |
| 22 | 38 | 8.0 |
| 23 | 46 | 7.2 |
| 24 | 54 | 9.3 |
| 25 | 61 | 8.4 |
| 26 | 69 | 14.4 |
| 27 | 76 | 11.1 |
| 28 | 83 | 16.7 |
| 29 | 97 | 16.8 |
| 30 | 97 | 17.8 |
| 31 | 97 | 14.4 |

TABLE 5-continued

Appearance of Examples 22 Through 36

| Example | Average Mole % Ethylene Glycol of the Polyester Phase | Transmission |
| --- | --- | --- |
| 32 | 97 | 14.7 |
| 33 | 97 | 15.9 |
| 34 | 98 | 6.9 |
| 35 | 98 | 5.1 |
| 36 | 100 | 7.4 |

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A clear thermoplastic molding composition comprising:
   (a) about 5 to about 95% by weight of a polyester, comprising: repeat units derived from terephthalic acid, ethylene glycol, and 1,4-cyclohexanedimethanol wherein the mole ratio of ethylene glycol to 1,4-cyclohexanedimethanol is from about 66:34 to about 98:2, said polyester having an I.V. of about 0.3 dL/g to about 1.2 dL/g, and
   (b) about 5 to about 95% by weight of a polyphenylene ether, said polyphenylene ether having an intrinsic viscosity of about 0.15 dL/g to about 0.60 dL/g.

2. The composition of claim 1 wherein the mole ratio of ethylene glycol to 1,4-cyclohexanedimethanol is about 69:31 to about 97:3.

3. The composition of claim 1 wherein the mole ratio of ethylene glycol to 1,4-cyclohexanedimethanol is about 82:18 to about 97:3.

4. The composition of claim 1 wherein the mole ratio of ethylene glycol to 1,4-cyclohexanedimethanol is about 69:31.

5. The composition of claim 1 wherein the inherent viscosity of the polyester is about 0.70 dL/g—about 1.0 dL/g.

6. The composition of claim 1 wherein the mole ratio of ethylene glycol to 1,4-cyclohexanedimethanol is about 97:3.

7. The composition of claim 1 containing a compatibilizer.

* * * * *